(12) United States Patent
Chang et al.

(10) Patent No.: US 9,122,141 B2
(45) Date of Patent: Sep. 1, 2015

(54) MICRO-PROJECTOR WITH CLIPPING STRUCTURE

(75) Inventors: Kun-Rong Chang, Hsin-Chu (TW); Wen-Chang Chien, Hsin-Chu (TW)

(73) Assignee: CORETRONIC CORPORATION, Hsin-Chu (TW)

( * ) Notice: Subject to any disclaimer, the term of this patent is extended or adjusted under 35 U.S.C. 154(b) by 754 days.

(21) Appl. No.: 12/479,839

(22) Filed: Jun. 7, 2009

(65) Prior Publication Data

US 2010/0060866 A1   Mar. 11, 2010

(30) Foreign Application Priority Data

Sep. 9, 2008   (TW) ................................ 97134606 A

(51) Int. Cl.
| | |
|---|---|
| *G06F 1/16* | (2006.01) |
| *G03B 21/28* | (2006.01) |
| *G03B 21/14* | (2006.01) |
| *H04N 9/31* | (2006.01) |
| *F16M 13/02* | (2006.01) |

(52) U.S. Cl.
CPC ................ *G03B 21/28* (2013.01); *G03B 21/14* (2013.01); *G06F 1/1639* (2013.01); *H04N 9/3141* (2013.01); *H04N 9/3173* (2013.01); *F16M 13/02* (2013.01); *F16M 13/022* (2013.01)

(58) Field of Classification Search
CPC ...... G03B 21/28; G03B 21/14; H04N 9/3173; H04N 9/3141; F16M 13/02; F16M 13/022; G06F 1/1639

USPC ..................... 353/100, 101, 119, 39
See application file for complete search history.

(56) References Cited

U.S. PATENT DOCUMENTS

| | | | |
|---|---|---|---|
| 6,652,104 B2 | 11/2003 | Nishida et al. | |
| 7,093,811 B2 * | 8/2006 | Wu | 248/229.12 |
| 2005/0190344 A1 * | 9/2005 | Lin | 353/71 |
| 2006/0127082 A1 * | 6/2006 | Sitoh et al. | 396/428 |
| 2007/0195294 A1 * | 8/2007 | Willey et al. | 353/119 |
| 2008/0136973 A1 * | 6/2008 | Park | 348/744 |
| 2008/0316438 A1 * | 12/2008 | Midorikawa | 353/70 |

FOREIGN PATENT DOCUMENTS

| | | |
|---|---|---|
| TW | 537419 | 5/2002 |
| TW | 523122 | 3/2003 |
| TW | M254619 | 1/2005 |
| TW | M256458 U | 2/2005 |
| TW | M268621 | 6/2005 |
| TW | I251150 | 3/2006 |
| TW | M291661 U | 6/2006 |

OTHER PUBLICATIONS

Taiwan Official Action issued Aug. 30, 2012.

* cited by examiner

*Primary Examiner* — Bao-Luan Le
(74) *Attorney, Agent, or Firm* — Chun-Ming Shih

(57) ABSTRACT

A micro-projector applied to a portable computer includes a projecting device and a clipping structure. The projecting device is capable of communicating with the portable computer through signals and projecting a projection light. The clipping structure is capable of clipping the portable computer selectively. The projecting device is disposed on the clipping structure.

7 Claims, 7 Drawing Sheets

MICRO-PROJECTOR WITH CLIPPING STRUCTURE

BACKGROUND

This application claims priority to a Taiwan application No. 097134606 filed on Sep. 9, 2008.

1. Field of the Invention

The present invention relates to a micro-projector, and more particularly, it relates to a micro-projector applied to a portable computer.

2. Description of the Prior Art

FIG. 1 is a schematic view showing a usage state of a conventional projector. Referring to FIG. 1, the conventional projector 100 is disposed on a desk-top C1 and electrically connected to a portable computer N1 through a transmission wire 110. The portable computer N1 disposed on the desk-top C1 transmits electrical signals to the projector 100. The projector 100 receives electrical signals to project a projection light L1 onto a screen S1.

However, in usage of the projector 100, the desk-top C1 may be large enough for disposing the projector 100 and the portable computer N1 thereon. Accordingly, the space occupied by the projector 100 is relatively large.

BRIEF SUMMARY

The invention is directed to provide a micro-projector clipping a portable computer such that the space occupied by the micro-projector is relatively small.

Other advantages and objects of the present invention may be further comprehended through the technical features disclosed in the present invention.

In order to achieve one or part of or all the objectives or other objectives, in an embodiment of the invention, a micro-projector applied to a portable computer is provided. The portable computer may be a notebook computer or a personal digital assistant (PDA), but the usage scope of the portable computer is not limited. The micro-projector includes a projecting device and a clipping structure. The projecting device is capable of communicating with the portable computer through signals and projecting a projection light. The clipping structure is capable of clipping the portable computer selectively. The projecting device is disposed on the clipping structure.

Since the micro-projector clips the portable computer, compared to the conventional art, the micro-projector of the embodiment of the invention is not necessary disposed on a carrying surface such as a desk-top. Thus, the space occupied by the micro-projector is relatively small.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the embodiments of the invention, and are incorporated in and constitute part of this specification. The drawings illustrate embodiments of the invention and, together with the description, serve to explain the principles of the invention.

DETAILED DESCRIPTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component directly or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

First Embodiment

Figure 1:
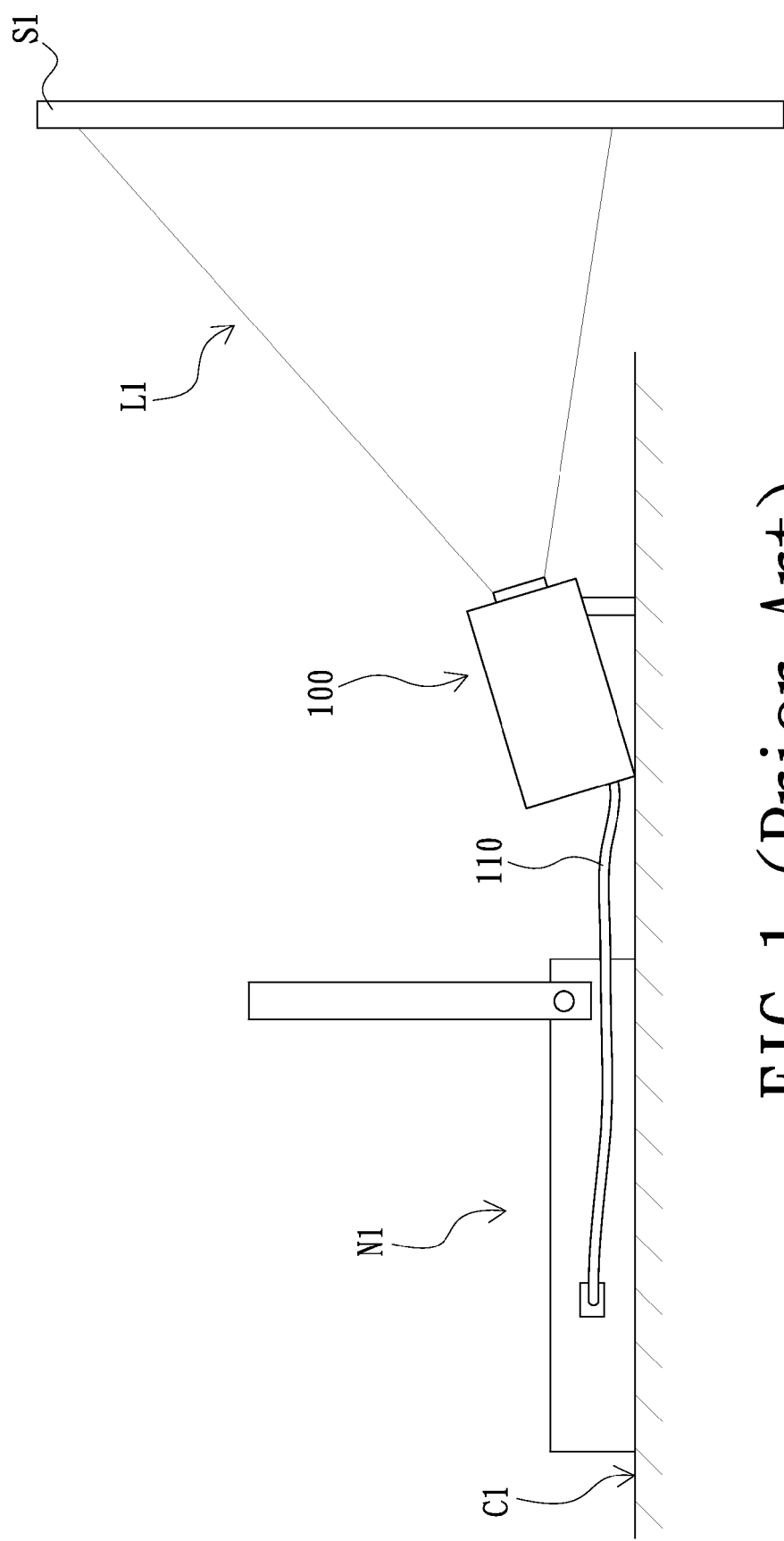
FIG. 1 is a schematic view showing a usage state of a conventional projector.
Figure 2:
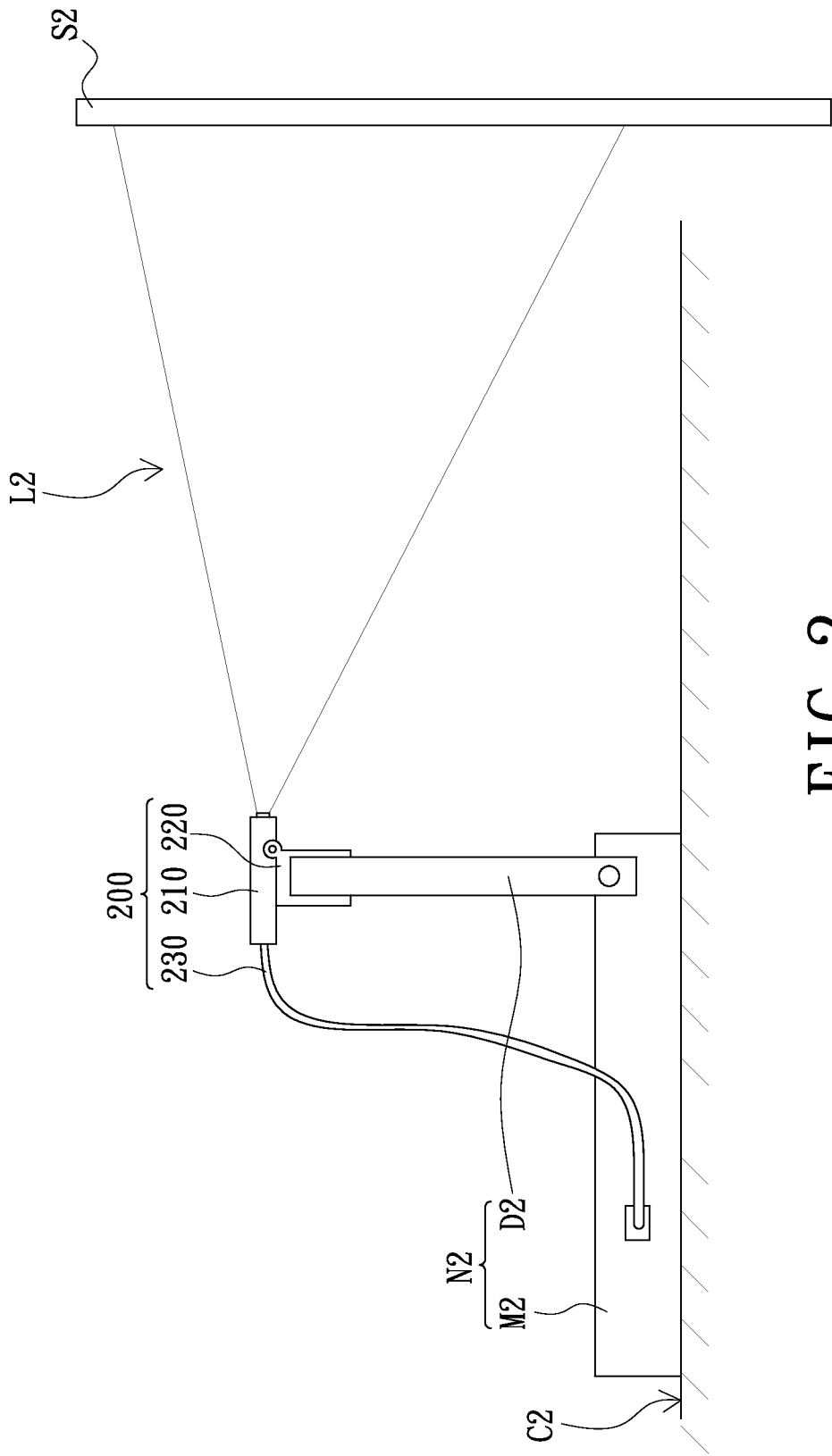
FIG. 2 is a schematic view showing a micro-projector according to a first embodiment of the invention applied to a portable computer.
Figure 3:
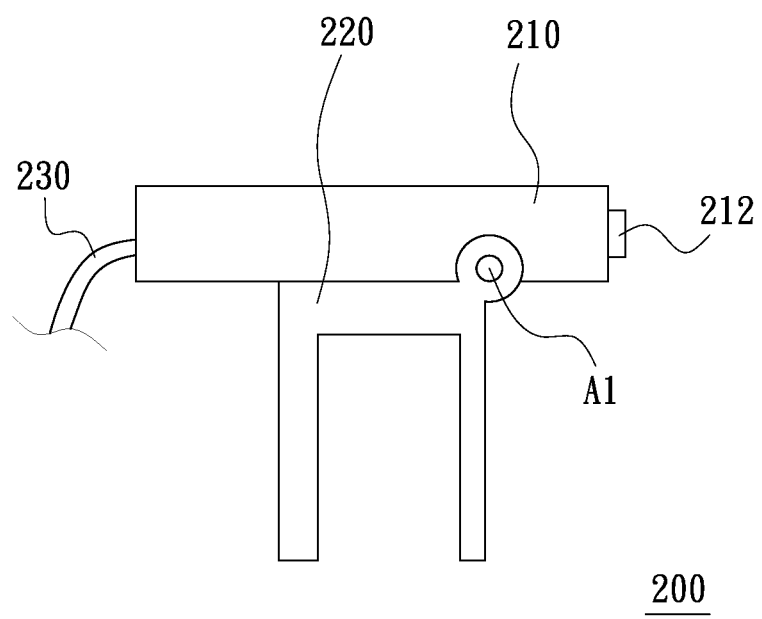
FIG. 3 is a schematic view of the micro-projector of FIG. 2.

FIG. 2 is a schematic view showing a micro-projector according to a first embodiment of the invention applied to a portable computer. FIG. 3 is a schematic view of the micro-projector of FIG. 2. Referring to FIGS. 2 and 3, the micro-projector 200 of the embodiment of the invention is applied to a portable computer N2. The portable computer N2 such as a notebook computer includes a main body M2 and a display D2. The display D2 is pivoted to the main body M2 and the main body M2 is disposed on a carrying surface C2 such as a desk-top.

The micro-projector 200 includes a projecting device 210, a clipping structure 220 and a transmission wire 230. The projecting device 210 is electrically connected to the main body M2 of the portable computer N2 through the transmission wire 230 and is capable of projecting a projection light L2. The clipping structure 220 is capable of clipping the display D2 of the portable computer N2 selectively and the projecting device 210 is disposed on the clipping structure 220.

Since the micro-projector 200 clips the display D2 of the portable computer N2, compared to the conventional art, the micro-projector 200 is not necessary disposed on the carrying surface C2. Thus, the space occupied by the micro-projector 200 is relatively small.

In this embodiment of the invention, the projecting device 210 is capable of revolving about a first axis A1 and revolving relatively to the portable computer N2. Furthermore, the projecting device 210 is pivoted to the clipping structure 220 so that the projecting device 210 is capable of revolving about the first axis A1 and revolving relatively to the portable computer N2. In this embodiment of the invention, the first axis A1 is perpendicular to the plane of the figures. The projecting device 210 may be adjusted to an appropriate position through the above revolving mechanism so that the projecting device 210 is capable of projecting the projection light L2 onto a screen S2 or the carrying surface C2 according to the requirement of a user. It should be noted that the projecting device 210 may be pivoted to the clipping structure 220 in the same manner as the display D2 is pivoted to the main body M2 so that the projecting device 210 is able to be adjusted to an appropriate position.

In addition, the image quality of the projecting device 210 is adjusted by means of revolving an adjusting ring (not shown), such as a zoom ring of a projecting lens 212 of the projecting device 210. The distance between a projecting lens 212 of the projecting device 210 and a projected surface, i.e., a surface of the screen S2 or the carrying surface C2, is adjusted by means of revolving the display D2.

Since the projecting device 210 is pivoted to the clipping structure 220, the projection light L2 is selectively projected onto the screen S2 or the carrying surface C2 where the portable computer N2 is disposed. Thus, the micro-projector 200 is convenient to be used by a user.

Figure 4:
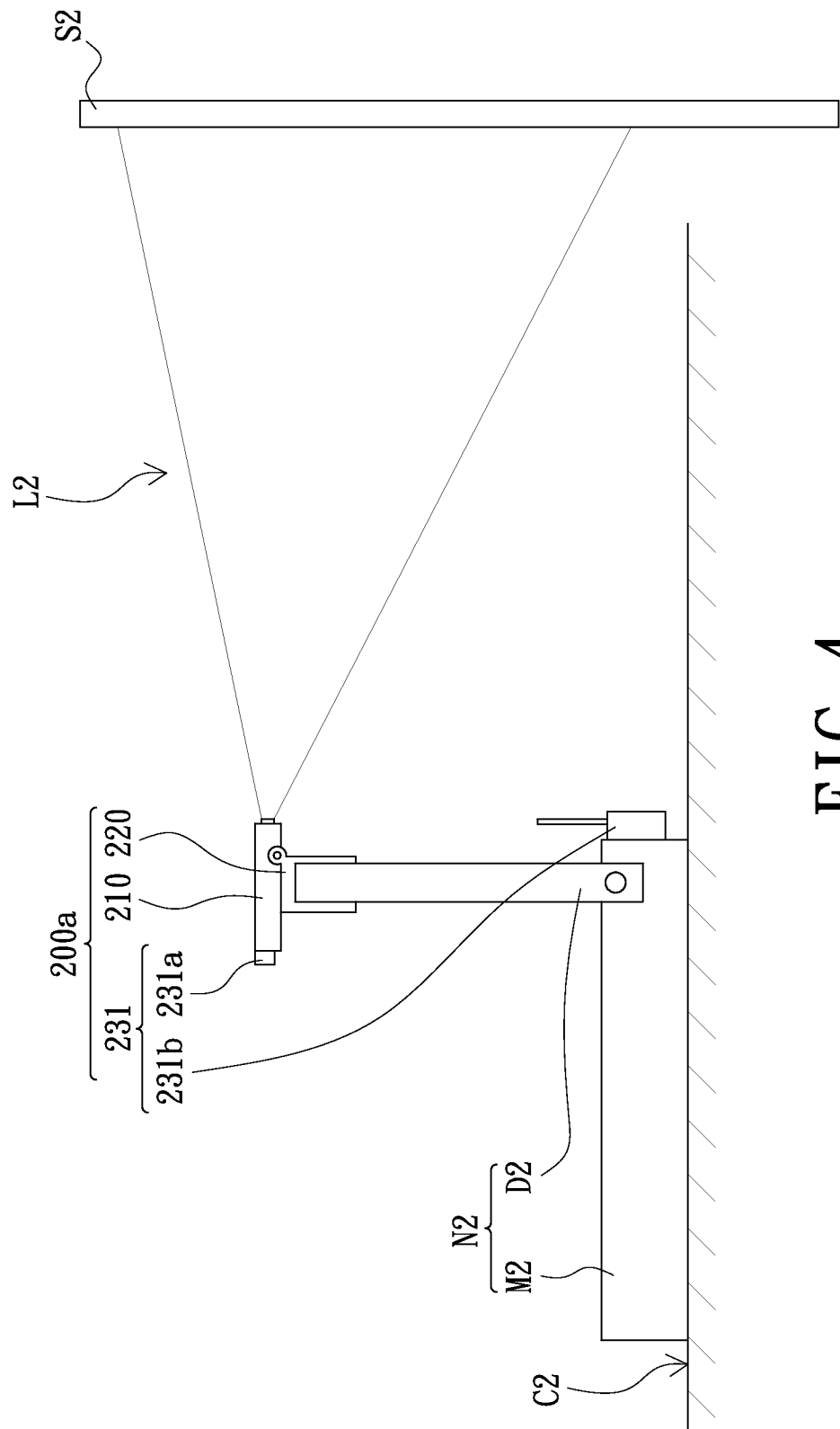
FIG. 4 is a schematic view showing another micro-projector according to the first embodiment of the invention applied to the portable computer.

FIG. 4 is a schematic view showing another micro-projector according to the first embodiment of the invention applied to a portable computer. Referring to FIGS. 2, 3 and 4, the difference between the micro-projector 200a and the micro-projector 200 is that the micro-projector 200a includes a projecting device 210, a clipping structure 220 and a wireless module 231. The wireless module 231 includes a receiving end 231a and a transmitting end 231b. The receiving end 231a is disposed at the projecting device 210 and the transmitting end 231b is disposed at the portable computer N2. The projecting device 210 is connected to the portable computer N2 through a wireless transmission between the receiving end 231a and the transmitting end 231b so that an image data is transmitted from the main body M2 of the portable computer N2 to the projecting device 210 through the wireless transmission. Therefore, the micro-projector 200a including the wireless module 231 having the function of the wireless transmission is more convenient to be used by a user.

Second Embodiment

Figure 5:
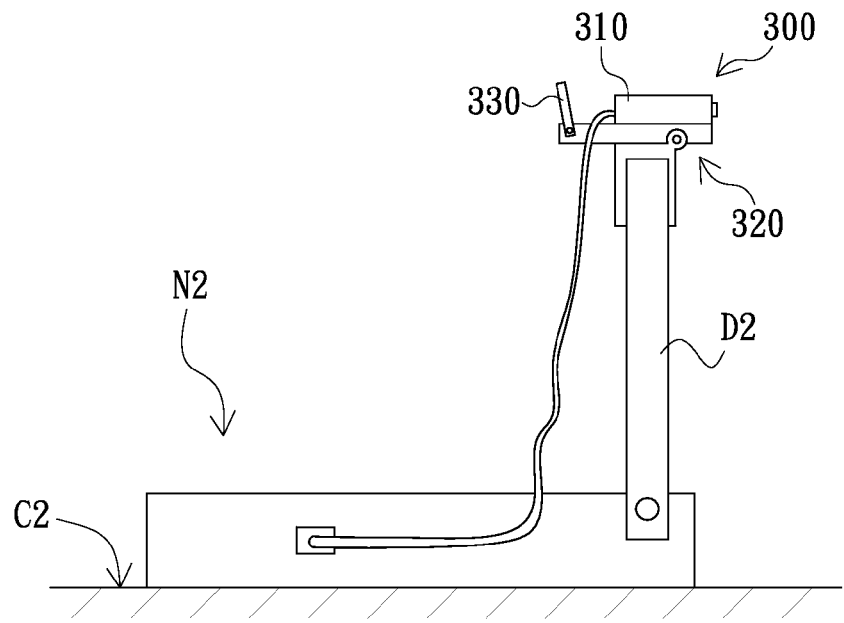
FIG. 5 is a schematic view showing a micro-projector according to a second embodiment of the invention applied to a portable computer.
Figure 6:
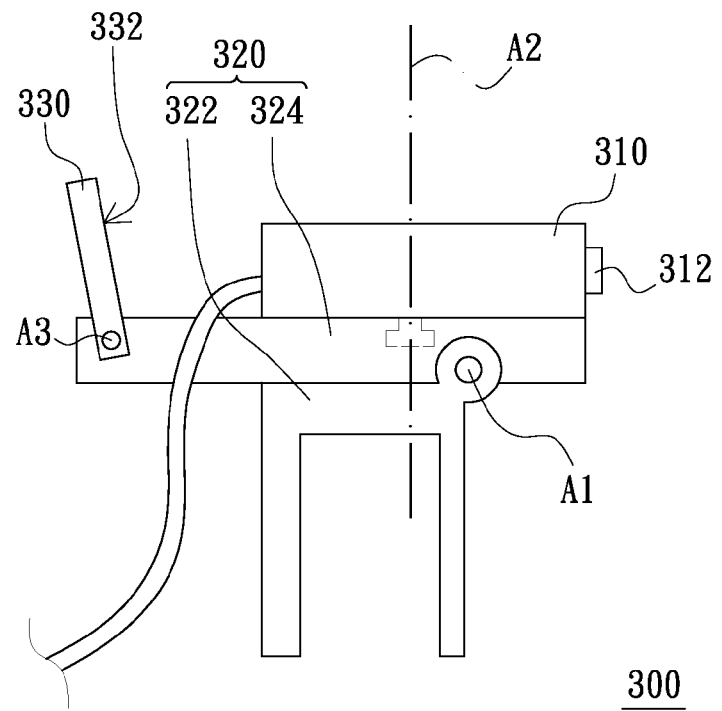
FIG. 6 is a schematic view of the micro-projector of FIG. 5.

FIG. 5 is a schematic view showing a micro-projector according to a second embodiment of the invention applied to a portable computer. FIG. 6 is a schematic view of the micro-projector of FIG. 5. Referring to FIGS. 5 and 6, the difference between the micro-projector 300 of the second embodiment of the invention and the micro-projector 200 of the first embodiment of the invention is that a projecting device 310 of the micro-projector 300 is capable of revolving about a second axis A2 and revolving relatively to the portable computer N2, and the second axis A2 is perpendicular to the first axis A1. Furthermore, the micro-projector 300 further includes a reflector 330 such as a plane mirror having a reflective surface 332.

Specifically, a clipping structure 320 of the micro-projector 300 includes a clipping element 322 and a carrying element 324. The clipping element 322 is capable of clipping the display D2 of the portable computer N2 selectively. The carrying element 324 is pivoted to the clipping element 322. The carrying element 324 is capable of revolving about the first axis A1 and revolving relatively to the portable computer N2. The projecting device 310 is pivoted to the carrying element 324 so that the projecting device 310 is capable of revolving about the second axis A2 and revolving relatively to the portable computer N2. Furthermore, the reflector 330 is pivoted to the carrying element 324 of the clipping structure 320 and capable of revolving about a third axis A3. The third axis A3 is parallel to the first axis A1 in the embodiment.

Figure 7:
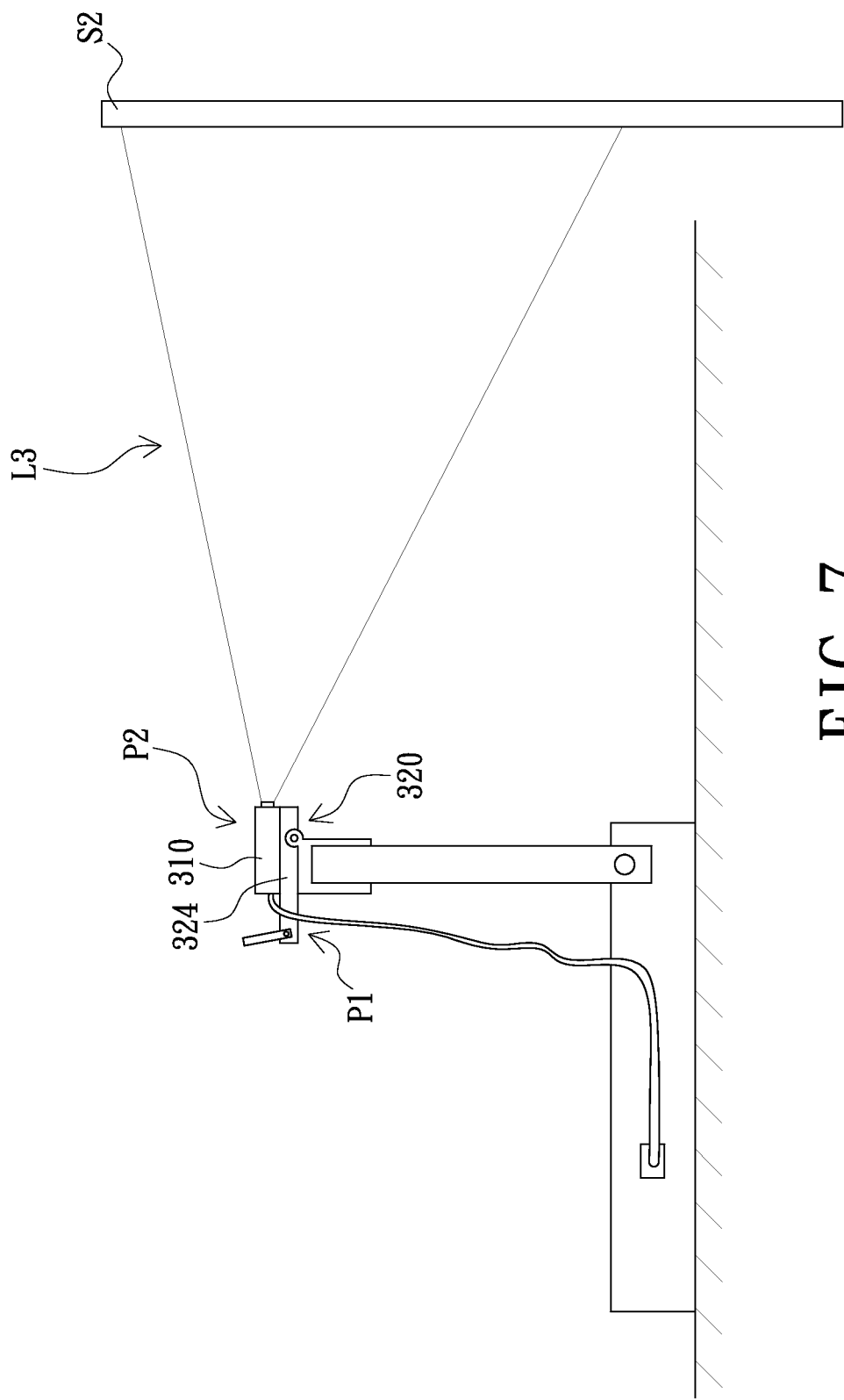
FIG. 7 is a schematic view showing a first usage state of the micro-projector of FIG. 5.
Figure 8:
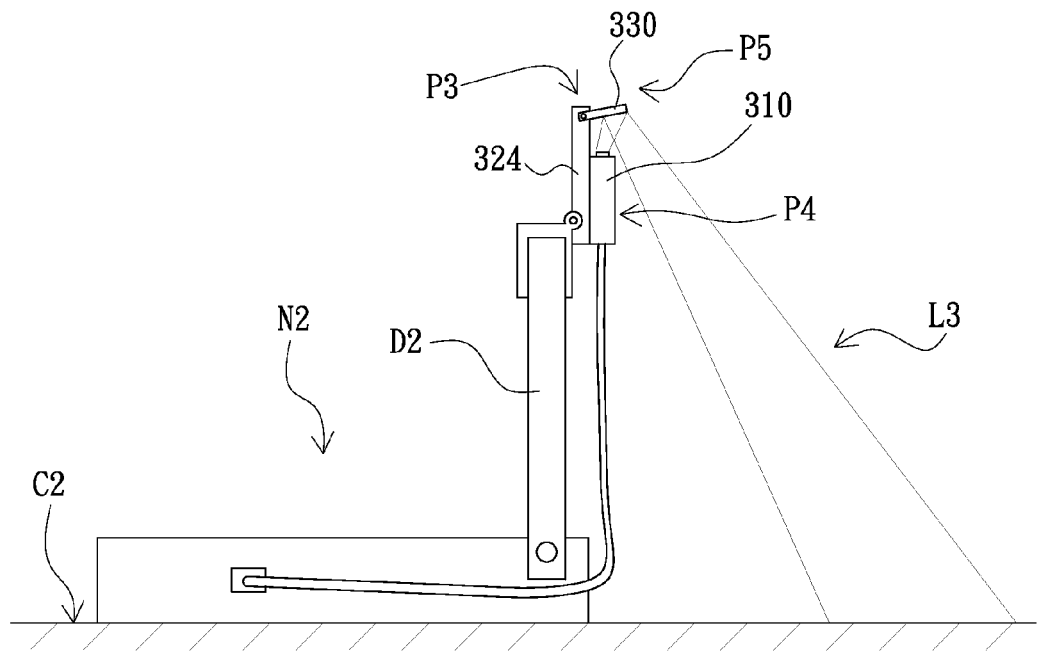
FIG. 8 is a schematic view showing a second usage state of the micro-projector of FIG. 5.

FIG. 7 is a schematic view showing a first usage state of the micro-projector of FIG. 5. FIG. 8 is a schematic view showing a second usage state of the micro-projector of FIG. 5. Referring to FIGS. 6 and 7, when the carrying element 324 is located at a first position P1 in FIG. 7 and the projecting device 310 is located at a second position P2 in FIG. 7, the projecting device 310 projects a projection light L3 onto the screen S2. At this time, the reflector 330 is not in the light path of the projection light L3. Referring to FIGS. 6 and 8, when the carrying element 324 is located at a third position P3 in FIG. 8, the projecting device 310 revolves about the second axis A2 to a fourth position P4 in FIG. 8 and the reflector 330 is adjusted to a fifth position P5 in FIG. 8. At this time, the reflective surface 332 of the reflector 330 faces the carrying surface C2 where the portable computer N2 is disposed, the reflector 330 is located in the light path of the projection light L3 projected by the projecting device 310 and the reflective surface 332 of the reflector 330 reflects the projection light L3 onto the carrying surface C2.

Figure 9:
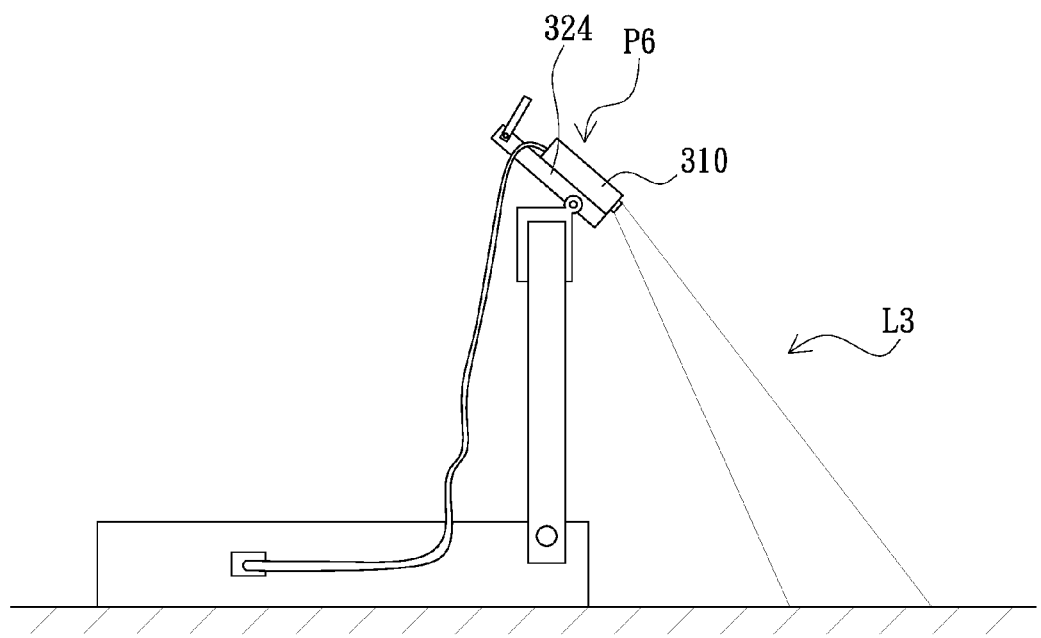
FIG. 9 is a schematic view showing a third usage state of the micro-projector of FIG. 5.

FIG. 9 is a schematic view showing a third usage state of the micro-projector of FIG. 5. Referring to FIGS. 6 through 9, it should be emphasized that the projecting device 310 may revolve from the second position P2 in FIG. 7 to a six position P6 where a projection lens 312 of the projecting device 310 faces downwardly through the carrying element 324, so that the projecting device 310 directly projects the projection light L3 onto the carrying surface C2. However, the light path of the projection light L3 in FIG. 9 is shorter than the light path of the projection light L3 in FIG. 8. Therefore, the image formed by the projection light L3 in FIG. 9 projected onto the carrying surface C2 is smaller than that formed by the projection light L3 in FIG. 8 projected onto the carrying surface C2.

Since the reflector 330 is capable of reflecting the projection light L3 projected by the projecting device 310 onto the carrying surface C2 where the portable computer N2 is disposed, an image formed by the projection light L3 projected by the projecting device 310 onto the carrying surface C2 may become larger. In addition, the keystone distortion of the projected image may be decreased by means of revolving the reflector 330, the carrying element 324 and/or the display D2.

According to the mentioned above, the micro-projector of the embodiment of the invention has at least one of the following or other advantages:

1. Since the micro-projector clips the portable computer, compared to the conventional art, the micro-projector is not necessarily disposed on the carrying surface. Thus, the space occupied by the micro-projector is relatively small.

2. Since the projecting device is pivoted to the clipping structure, the projection light is selectively projected onto the screen or the carrying surface where the portable computer is disposed. Thus, the micro-projector is convenient to be used by a user.

3. Since the reflector is capable of reflecting the projection light projected by the projecting device onto the carrying surface, an image formed by the projection light projected by the projecting device onto the carrying surface may become larger.

4. The keystone distortion of the projected image may be decreased by means of revolving the reflector, the carrying element and/or the display.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A micro-projector applied to a portable computer, comprising:
    a projecting device communicating with the portable computer through signals and projecting a projection light, wherein the projecting device revolves relatively to the portable computer about a first axis;
    a clipping structure comprising a clipping element clipping the portable computer selectively and a carrying element revolved relatively to the clipping element about the first axis, wherein the projecting device is disposed on the carrying element of the clipping structure, the projecting device and the carrying element revolving together about the first axis and relatively to the clipping element, and wherein the projecting device is pivoted to an end of the carrying element, and revolves relatively to the carrying element about a second axis, and the second axis is perpendicular to the first axis; and
    a reflector disposed on the other end of the carrying element and being adjustably revolved about a third axis relative to the carrying element at a desired angle for reflecting the projection light, when the projecting device is revolved about the second axis relatively to the carrying element to a position facing toward the reflector, the reflector reflecting the projection light projected onto the reflector by the projecting device to a surface or a screen.

2. The micro-projector as claimed in claim 1, wherein the projecting device is pivoted to the clipping structure to make the projecting device be capable of revolving about the first axis and revolving relatively to the portable computer.

3. The micro-projector as claimed in claim 1, wherein the portable computer is disposed on a carrying surface and the reflector is capable of reflecting the projection light onto the carrying surface.

4. The micro-projector as claimed in claim 1, further comprising a transmission wire, wherein the projecting device is electrically connected to the portable computer through the transmission wire.

5. The micro-projector as claimed in claim 1, further comprising a wireless module, wherein the wireless module comprises a receiving end and a transmitting end, the receiving end is disposed at the projecting device, the transmitting end is disposed at the portable computer, and the projecting device is connected to the portable computer through a wireless transmission between the receiving end and the transmitting end.

6. The micro-projector as claimed in claim 1, wherein the portable computer is a notebook computer or a personal digital assistant.

7. The micro-projector as claimed in claim 1, wherein the first axis and the third axis are disposed at opposite ends of the carrying element.

* * * * *